July 30, 1968     D. SMITH     3,395,284
DEVICE FOR SELECTIVELY SENSING RECORDED INFORMATION
Filed Sept. 23, 1964
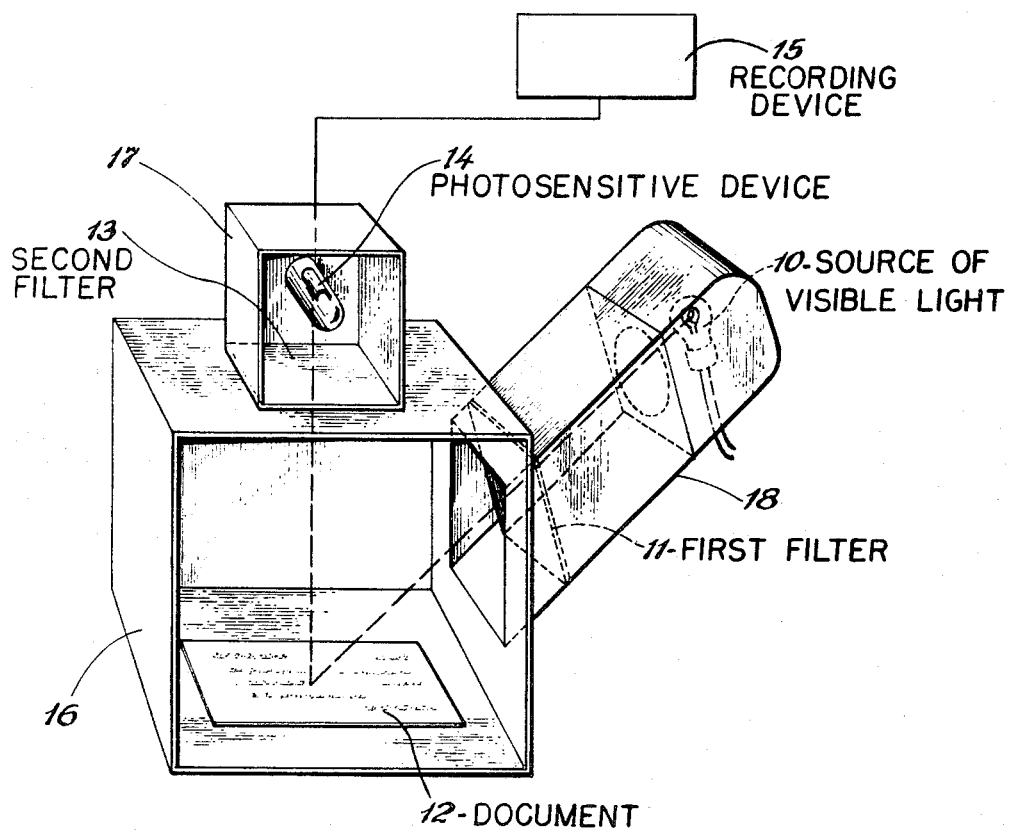
INVENTOR.
Daniel Smith United States Patent Office 3,395,284
Patented July 30, 1968

3,395,284
DEVICE FOR SELECTIVELY SENSING
RECORDED INFORMATION
Daniel Smith, Riverdale, N.Y., assignor to Interchemical Corporation, New York, N.Y., a corporation of Ohio
Substituted for abandoned application Ser. No. 51,567, Aug. 24, 1960. This application Sept. 23, 1964, Ser. No. 400,631
3 Claims. (Cl. 250—219)

ABSTRACT OF THE DISCLOSURE

A device for reading intelligence on documents, having a source of visible light, a selective first filter, documents having indicia thereon of daylight fluorescent material, a second filter capable of transmitting the fluorescent light engendered on said material, the second filter being substantially opaque to the light transmitted through the first filter, and a photosensitive device for observing the result. A suitable housing is provided also.

This invention relates to a device for selectively sensing information recorded with daylight fluorescent material. More particularly it relates to a device for discriminating between markings made with daylight fluorescent material and all other markings by using two filters having practically no wavelength range of transmission in common, a source of visible light, and a photosensitive device.

In any method for reading written or printed information, it is desirable to be able to distinguish between the markings that provide the desired information and all other markings. Photoelectric methods have been used to make this distinction through differences in color and even through differences in gloss. These systems did not prove to be very selective even when two photocells were used for scanning. Limitations were imposed by the marking materials used and also by the accidental markings present which modified the reference of the backgrounds.

The present invention makes use of daylight fluorescent markings for imparting the desired information. These are excited by a band of visible radiation limited in wavelength range by means of a filter. The fluorescence so produced, of longer wavelength than the exciting beam, is transmitted through a second filter disposed in front of a photosensitive device, which responds to the wavelengths of the transmitted fluorescent radiation. The two filters should have no appreciable wavelength range of transmission in common, that is, when both filters are superimposed they should be practically opaque to visible light. Only one photocell is needed in this method when an electronic senser is used.

By the term "daylight fluorescent material" is meant one of those substances which, when acted upon by a beam of visible light, emits light of a relatively high intensity having a wavelength different from that of the incident light, the light so emitted being in addition to the normally reflected incident light.

The optical system should be protected from stray light sources by suitable housing or other light excluding means.

The source of illumination can be any convenient one, such as ordinary electric bulbs, daylight, arc lamps, etc. Suitable light filters are available in many photographic supply stores. Particularly useful, for example, are the Wratten series of narrow transmission filters manufactured by Eastman Kodak Company. The exciting filters will normally be green or blue, while the receptor filters will transmit longer wavelengths and will range from yellow to red. A suitable combination would be a green exciting beam, a yellow to red daylight fluorescence, and a red receptor filter. Another could have a blue filter disposed before the source of illumination, green to yellow daylight fluorescence, and a minus-blue receptor filter. In the first example given above, a green Wratten #74 (source) and a red Wratten #29 (receptor) would serve well, particularly with red or magenta fluorescence, although scarlet to yellow would also be operative. In the second example a Wratten #49 for excitation and a Wratten #12 for reception are operative.

The photosensitive device can be the human eye, photographic apparatus with plates or film, or more commonly electronic devices such as the automatic electronic addressing machines that operate on the scanning principle. When using the latter, it is preferable to select a photomultiplier or other photocell having a superior signal-to-noise ratio and one having a peak sensitivity suited to the wavelengths to be received.

Referring to the drawing, a perspective view of the system is shown. The source of visible light 10 in the housing 18 supplies the exciting beam by sending radiation through the first filter 11. The exciting beam illuminates document 12 producing daylight fluorescence on the markings of interest. The second, receptor, filter 13 receives the light reflected from document 12 and transmits practically only the wavelengths of the daylight fluorescence. Stray light is excluded by the main housing 16 and the auxiliary housings 17 and 18. The wavelengths substantially isolated by the second filter 13 then activate the photosensitive device 14 which is attached to the recorder 15. A side has been removed from the main housing 16 and from the auxiliary housing 17 in order to show the interior arrangements.

The material for recording the desired intelligence should be selected with due regard to the extraneous colors expected. For example, bank checks sometimes are cancelled with ink that produces reddish fluorescence. The interference of this radiation would be eliminated or greatly reduced by using green to yellow-green daylight fluorescent material with an appropriate optical system such as blue illumination and green or minus blue reception.

Sharp contrast is produced between informative markings and extraneous ones. Even ordinary fluorescence on unwanted background (such as given by some bank cancellation inks) is suppressed. The invention is particularly directed towards the reading of desired information on bank checks by electronic methods, but other uses will be suggested to those skilled in the art by the disclosures in the present invention.

What is claimed is:
1. A device for reading intelligence contained on documents comprising
    (1) a source of visible light,
    (2) a first filter capable of transmitting only part of this light, and located in proximity to said light source,
    (3) intelligence recorded in patterns of daylight fluorescent material, on documents located in proximity to said first filter,
    (4) a second filter located in proximity to said documents and capable of transmitting the light emitted from the daylight fluorescent material, said light being due to the daylight fluorescence of the material, but the second filter being substantially opaque to light of the wavelengths transmitted through the first filter,
    (5) a photosensitive device located in proximity to said record filter and placed so as to receive light transmitted through the second filter and being capable of recording the intelligence received, and

(6) a suitable housing capable of excluding stray light said housing comprising a first auxiliary housing for said light source and said first filter, a main housing for said documents and a second auxiliary housing for said second filter and said photosensitive device.

2. The device described in claim 1 in which the documents are bank checks.

3. The device described in claim 2 in which the photosensitive device is a photocell connected to an electronic apparatus capable of transforming the photocell impulses into visible recordings.

References Cited
UNITED STATES PATENTS

| | | | |
|---|---|---|---|
| 2,417,384 | 3/1947 | Switzer | 250—71 |
| 2,950,799 | 8/1960 | Timms | 250—219 |
| 3,105,908 | 10/1963 | Burkhardt et al. | 250—71 X |
| 3,128,385 | 4/1964 | Scharf et al. | 250—83.3 |
| 3,180,988 | 4/1965 | Burkhardt et al. | 250—71 |
| 3,207,910 | 9/1965 | Hirschfeld et al. | 250—226 |
| 3,052,405 | 9/1962 | Woodland | 250—219 |

WALTER STOLWEIN, *Primary Examiner.*